United States Patent
Vande Haar et al.

(10) Patent No.: US 11,052,769 B2
(45) Date of Patent: Jul. 6, 2021

(54) TRACTION CONTROL SYSTEM AND METHOD OF CONTROLLING A TRACTION MOTOR

(71) Applicant: DEERE & COMPANY, Moline, IL (US)

(72) Inventors: William J. Vande Haar, Janesville, IA (US); Steven A. Duppong, Waverly, IA (US); Zachary Kail, Cedar Falls, IA (US); Chase A. Freidig, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 118 days.

(21) Appl. No.: 16/284,665

(22) Filed: Feb. 25, 2019

(65) Prior Publication Data
US 2020/0269706 A1  Aug. 27, 2020

(51) Int. Cl.
*B60L 15/20* (2006.01)
*B60K 17/12* (2006.01)
*B60K 17/356* (2006.01)

(52) U.S. Cl.
CPC .......... *B60L 15/2054* (2013.01); *B60K 17/12* (2013.01); *B60K 17/356* (2013.01); *B60L 2200/28* (2013.01); *B60L 2240/461* (2013.01); *B60Y 2200/22* (2013.01); *B60Y 2200/91* (2013.01)

(58) Field of Classification Search
CPC ............ B60Y 2200/91; B60Y 2200/22; B60L 2240/461; B60L 15/2054; B60L 2200/28; B60K 17/12; B60K 17/356
See application file for complete search history.

(56) References Cited

U.S. PATENT DOCUMENTS

| | | | |
|---|---|---|---|
| 8,544,574 B2 | 10/2013 | Fegley et al. | |
| 9,037,346 B2 | 5/2015 | Keys, II et al. | |
| 9,551,418 B1 | 1/2017 | Duppong et al. | |
| 2012/0310494 A1* | 12/2012 | Asami ............... | B60W 10/30 701/50 |
| 2013/0022430 A1 | 1/2013 | Anderson et al. | |
| 2013/0076497 A1 | 3/2013 | Sheidler et al. | |
| 2013/0079979 A1 | 3/2013 | Sheidler et al. | |
| 2013/0079980 A1 | 3/2013 | Vuk et al. | |
| 2014/0303862 A1* | 10/2014 | Hoff ................. | F16H 48/32 701/67 |
| 2016/0029543 A1* | 2/2016 | Stich ................ | A01B 63/112 701/50 |
| 2016/0332606 A1* | 11/2016 | Buchner ............ | B60T 13/683 |

FOREIGN PATENT DOCUMENTS

| | | |
|---|---|---|
| DE | 102011013771 A1 | 9/2012 |
| DE | 102016213786 A1 | 2/2018 |
| DE | 102016220905 A1 | 4/2018 |

OTHER PUBLICATIONS

German Search Report issued in counterpart application No. 102020202421.9 dated Sep. 1, 2020 (07 pages).

* cited by examiner

*Primary Examiner* — Peter D Nolan
*Assistant Examiner* — Demetra R Smith-Stewart

(57) ABSTRACT

A traction control system and a method of controlling at least one traction motor of a trailer coupled to a work vehicle are provided. The method includes determining a work vehicle traction force, determining an output force command for at least one traction motor based at least partially on the work vehicle traction force, and controlling at least one traction motor according to the output force command.

19 Claims, 3 Drawing Sheets

TRACTION CONTROL SYSTEM AND METHOD OF CONTROLLING A TRACTION MOTOR

BACKGROUND

Work vehicles may pull, tow, or otherwise be coupled to one or more auxiliary vehicles, such as a cart, trailer, and/or implement. In particular examples, a tractor may pull a seeding implement during a seeding operation or a grain cart during a harvesting operation. The weight of one or multiple trailers coupled to the work vehicle, the weight of the trailer increasing substantially due to loading of material onto the trailer or the work vehicle, and/or the trailer(s) encountering non-ideal ground surface conditions, such as a steep grade or slippery conditions, may affect traction of the work vehicle.

SUMMARY

Various aspects of examples of the present disclosure are set out in the claims.

According to a first aspect of the present disclosure, a method of controlling at least one traction motor of a trailer coupled to a work vehicle is provided. The method includes determining a work vehicle traction force, determining an output force command for at least one traction motor based at least partially on the work vehicle traction force, and controlling at least one traction motor according to the output force command.

According to a second aspect of the present disclosure, a traction control system includes a work vehicle configured to produce a work vehicle traction force. The traction control system further includes a trailer coupled to the work vehicle and configured to provide ground-engaging traction with at least one traction motor. The traction control system further includes a controller configured to determine an output force command for at least one traction motor based at least partially on a difference between the work vehicle traction force and a threshold work vehicle traction force. The traction control system further controls at least one traction motor according to the output force command.

According to a third aspect of the present disclosure, a traction control system for a work vehicle produces a work vehicle traction force and is coupled to a trailer providing ground-engaging traction with at least one traction motor. The traction control system includes a controller configured to determine an output force command for at least one traction motor based at least partially on a difference between the work vehicle traction force and a threshold work vehicle traction force and control at least one traction motor according to the output force command.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
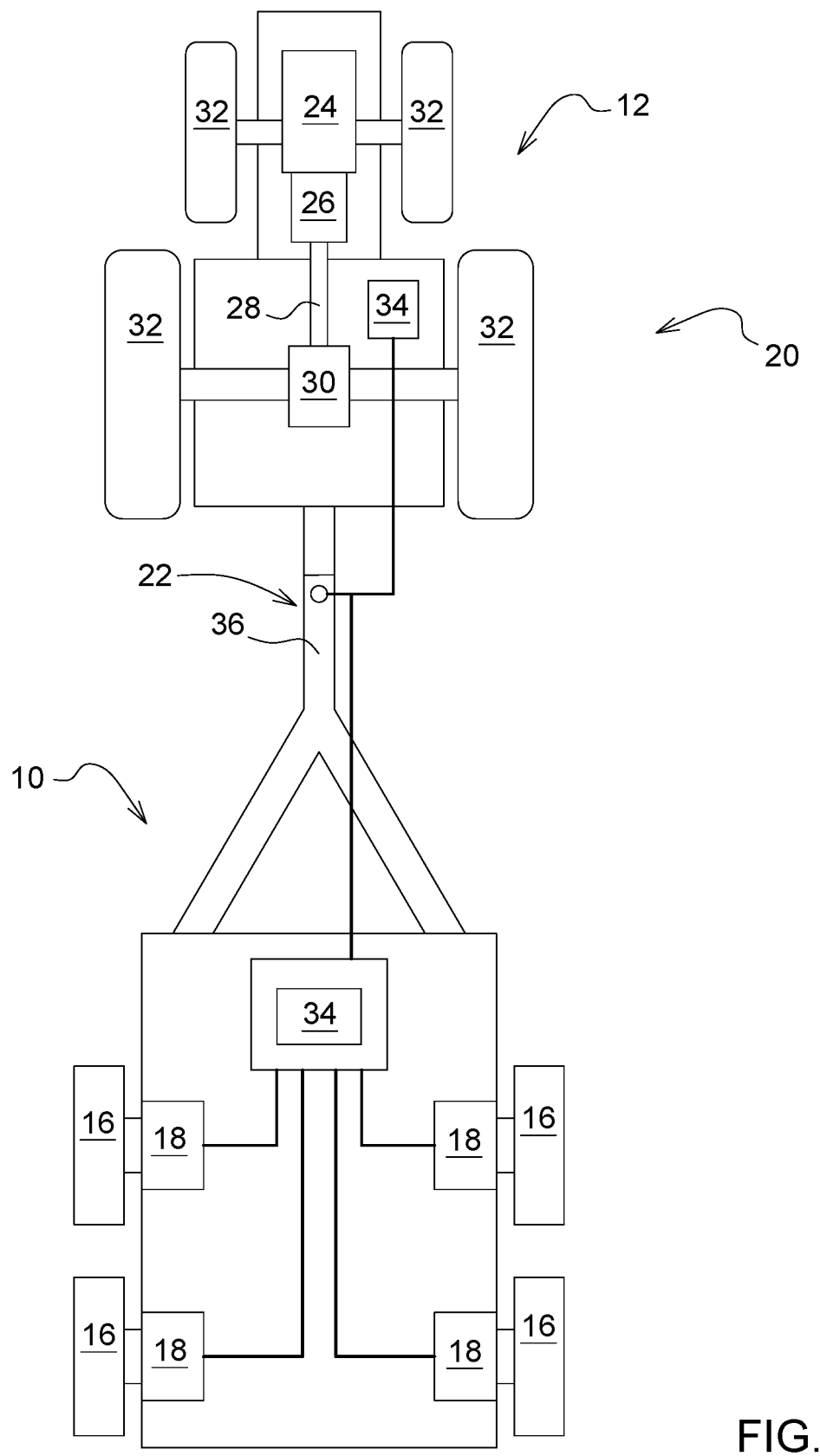
FIG. 1 is a schematic of a traction control system in accordance with an embodiment of the present disclosure.
Figure 2:
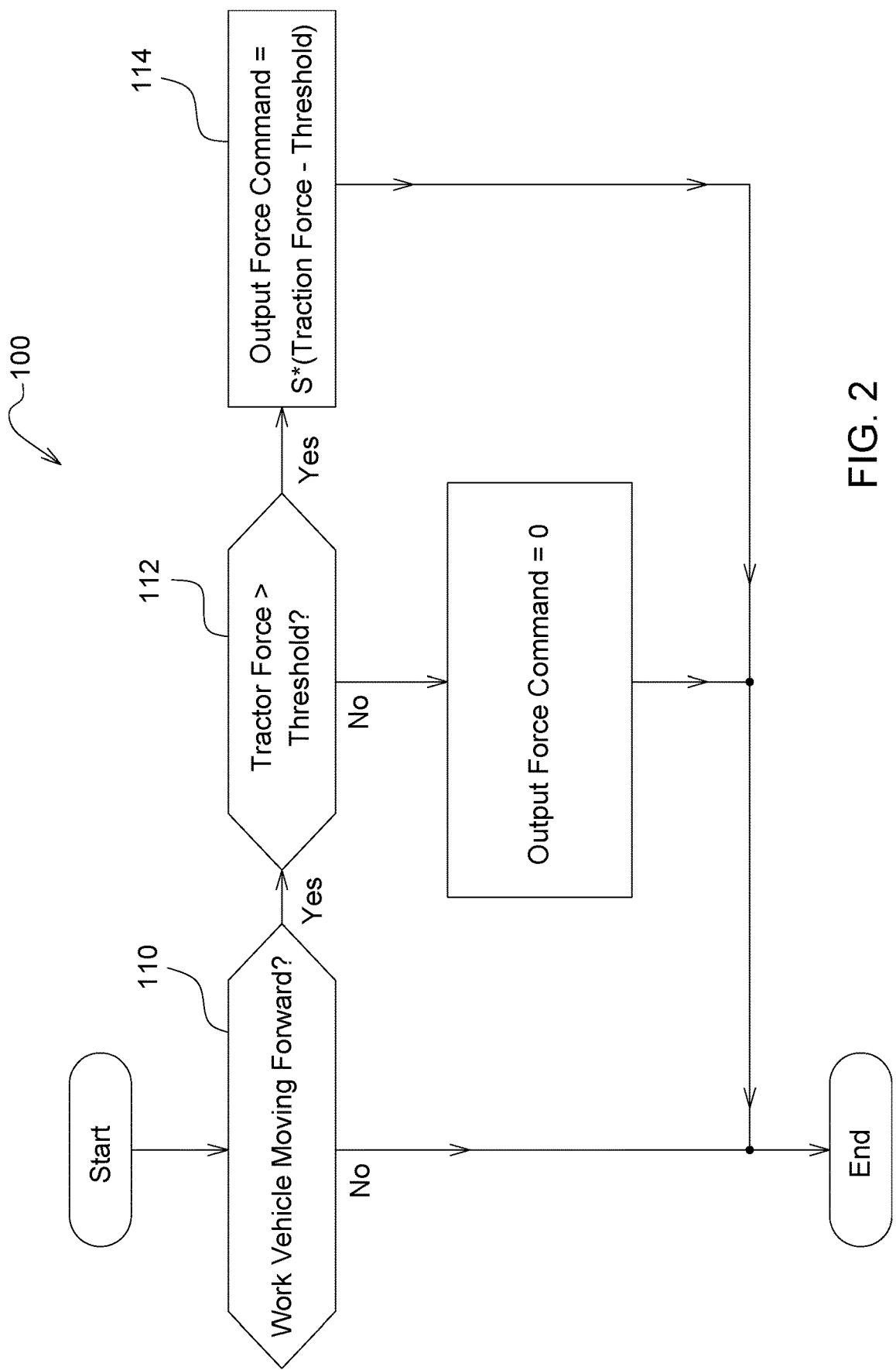
FIG. 2 is a flow diagram of a traction control system in accordance with an embodiment of the present disclosure.
Figure 3:
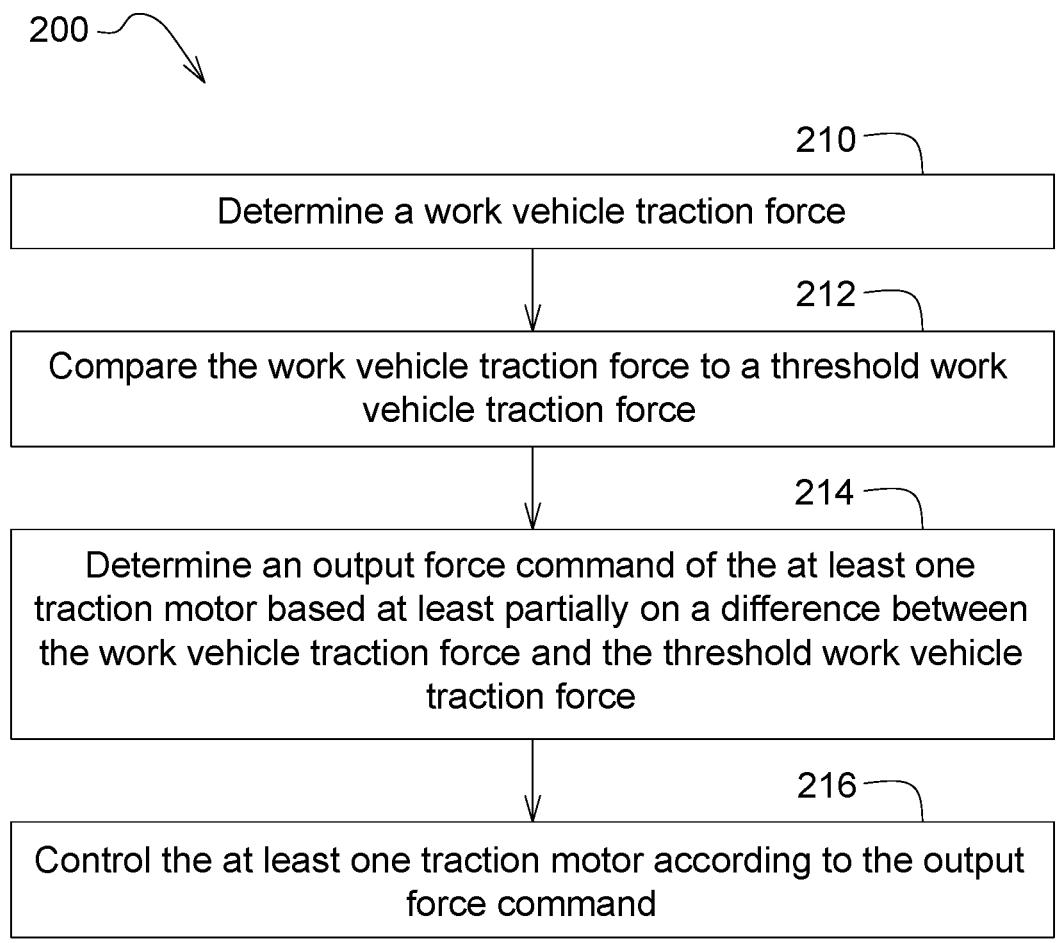
FIG. 3 illustrates a method of controlling at least one traction motor of a trailer coupled to a work vehicle in accordance with an embodiment of the present disclosure.

At least one example embodiment of the subject matter of this disclosure is understood by referring to FIGS. 1 through 3 of the drawings.

Referring now to FIG. 1, a traction control system 20 for a work vehicle 12 and a trailer 10 are illustrated in accordance with an embodiment of the present disclosure. The work vehicle 12 of one or more embodiments includes, without limitation, an articulated dump truck, backhoe loader, combine, compact track loader, compactor, cotton harvester, crawler dozer, crawler loader, excavator, feller buncher, forage harvester, forwarder, harvester, knuckleboom loader, milling machine, motor grader, mowers, asphalt paver, slipform concrete paver, scraper, skidder, sprayer, skid steer, sugar harvester, telehandler, tractor, tractor loader, utility vehicle, wheel loader, or other on-road or off-road vehicle. The trailer 10 of one or more embodiments includes, without limitation, an agricultural implement, such as a seeding or spraying implement, a grain cart or other cart, a construction or road-building attachment, or another towed vehicle, attachment, or work tool. Although not illustrated in FIG. 1, in additional embodiments, the trailer 10 includes two or more attachments and/or work tools, including one or more attachment(s) and/or work tool(s) coupled to the front of and/or behind the work vehicle 12.

As illustrated in FIG. 1, the system 20 of an embodiment further includes a drawbar 22, including a hitch or other coupling member, attaching the trailer 10 to the work vehicle 12, another trailer 10, or other pulling or primary drive vehicle.

The trailer 10 of the system 20 of the illustrated embodiment further includes one or more ground-engaging member(s) 16 including, without limitation, wheels and/or tracks. Each of the ground-engaging member 16 is driven by or at least coupled to a traction motor 18 configured to provide ground-engaging traction with an output force to the ground-engaging member 16 to assist movement or propulsion of the trailer 10 and/or the work vehicle 12. The one or more traction motor(s) 18 of embodiments include(s) a DC motor, an A/C motor, a direct-drive motor, an indirect-drive motor, an electrical motor, a hydraulic motor, a pneumatic motor, and/or another motor to name non-limiting examples. In one particular embodiment of the present disclosure, one or more traction motors 18 includes one or more permanent magnet A/C motors. In such embodiments where the traction motor(s) 18 are electrical motors, an embodiment of the work trailer 10 includes an onboard or electrically coupled source of electrical power (not shown), such as a single battery, a bank of batteries, or an alternator/generator driven by an internal combustion engine to supply/generate electrical power.

The work vehicle 12 of an embodiment is configured to produce a work vehicle traction force via a power source 24, such as an internal combustion engine in a non-limiting example, through a work vehicle transmission 26. In an embodiment, the work vehicle transmission 26 is an infinitely variable transmission (IVT) or a continuously variable transmission (CVT), and, in a further embodiment, the work vehicle transmission 26 is an electric infinitely variable transmission (eIVT). The work vehicle traction force is provided through a drivetrain 30 to one or more wheels, tracks, or other work vehicle ground-engaging member(s)

32. The transmission 26 includes an output shaft 28 having a shaft speed and a shaft torque. In an embodiment, such as that having the eIVT, the operation of the eIVT may allow measurement, determination, and/or the providing of the shaft speed or shaft torque of the output shaft 28. Further, the transmission 26, such as the eIVT in the present embodiment, includes one or more motor generator components. As explained in further detail below, a torque at the output shaft 28 of the transmission 26 is determined in an embodiment using a current passing through the motor generator component of the eIVT. The transmission 26 of an embodiment is a multi-mode transmission.

The system 20 illustrated in FIG. 1 further includes at least one controller 34 at the work vehicle 12 and/or the trailer 10. The controller 34 of an embodiment is configured to determine an output force command associated with the output force of each traction motor 18 based at least partially on a difference between the work vehicle traction force and a threshold work vehicle traction force. The controller 34 is further configured to control each traction motor 18 according to the output force command.

Referring now to the control schematic 100 of FIG. 2, in accordance with an embodiment, the controller 34 initially determines forward movement of the work vehicle 12 at block 110. The controller 34 determines the existence of forward movement of the work vehicle 12 and/or the rate of forward movement using, in non-limiting examples, data, signals, or other information supplied from components or sensors on the work vehicle 12 and/or the trailer 10, a GPS or other location-determining system of the work vehicle 12 or the trailer 10, or one or more of the traction motors 18. In additional embodiments not illustrated, the controller 34 does not determine forward movement of the work vehicle 12 or determines if the work vehicle 12 is moving in a forward or reverse direction. In embodiments not illustrated where the controller 34 determines that the work vehicle 12 is traveling in a reverse direction, it will be appreciated that the controller 34 may utilize one or more operations and/or components of the system 20 for control and operation of the traction motor(s) 18 for movement and/or traveling in a reverse direction.

Referring again to FIG. 2, if the controller 34 determines that the work vehicle 12 is moving forward, then the controller 34 compares the work vehicle traction force to a threshold work vehicle traction force at block 112. The threshold work vehicle traction force of particular embodiments is provided by and/or stored in a reference library, table, or map or as other read-only memory of the controller 34, determined by the controller 34 based on one or more conditions or settings of the work vehicle 12 and/or the trailer 10, or established as an adjustable or fixed constant value, automatically or manually provided to the controller 34. If the controller 34 determines that the work vehicle traction force is not greater than the threshold work vehicle traction force, the controller 34 either transmits an output force command signal of zero to the traction motor(s) 18 or does not transmit an output force command signal to the traction motor(s) 18 to provide assistive propulsion force. If the controller 34 determines that the work vehicle traction force is greater than the threshold work vehicle traction force, the controller 34 determines the output force command as the amount of output force to be provided by the traction motor(s) 18 or increases the output force as the output force command already provided by the traction motor(s) 18 at block 114.

Referring now to FIG. 3, a method 200 of controlling the traction motor(s) 18 is included in embodiments of the present disclosure. The method 200 may be executed by the controller 34 or locally or remotely by or through another system connected to the trailer 10 and, in at least one embodiment, the work vehicle 12. The method 200 includes determining, at step 210, the work vehicle traction force and comparing, at step 212, the work vehicle traction force to the threshold work vehicle traction force. The method 200 further includes determining, at step 214, the output force command of the traction motor(s) 18 based at least partially on the difference between the work vehicle traction force and the threshold work vehicle traction force. The method 200 further includes controlling, at step 216, the traction motor(s) 18 according to the output force command. The determination, comparison, or controlling steps 210, 212, 214, 216 of the method 200 may include any one or more steps performed as part of the system 20 and/or by the controller 34 described in embodiments of the present disclosure.

In accordance with embodiments of the present disclosure, the work vehicle traction force is determined using data from the transmission 26. As discussed above, the transmission 26 includes one or more motor generators MG2, such as to perform a variator function in an eIVT. In additional embodiments, instead of or in addition to the motor generator MG2, another motor, generator, and/or other component configured to receive a current is included in the transmission 26 to determine torque output in accordance with the present disclosure. In particular embodiments, the torque at MG2 is determined, such as by an inverter of the transmission, IVT, or eIVT in an embodiment, by correlating current usage to a torque output from the motor MG2. Accordingly, output torque is determined according to the following equation:

$$T_{Out} = -\frac{T_{MG2}\omega_{MG2}}{Factor_{MG2\ to\ Out}\omega_{MG2}} = -\frac{T_{MG2}}{Factor_{MG2\ to\ Out}}$$

To account for mechanical losses, an output torque reduction factor may be applied in an embodiment to determine the corrected output torque in accordance with the following equation:

$$T_{corrected\ out} = -\frac{T_{MG2}\omega_{MG2}}{Factor_{MG2\ to\ Out}\omega_{MG2}} * Factor_{Out\ Torque\ Reduction}$$

The corrected motor torque of the present embodiment may be utilized with an axle ratio (transmission output shaft speed/axle speed) and a rolling radius of a tire or other ground-engaging member 16 of the work vehicle 12 to determine the work vehicle traction force according to the following equation:

$$F_{Traction} = \frac{T_{Out} Ratio_{Axle}}{Rolling\ Radius}$$

As stated above with reference to FIG. 2, once the controller 34 determines that the work vehicle traction force is greater than the threshold work vehicle traction force, the controller 34 determines the output force command as the amount of output force to be provided by the traction motor(s) 18. In at least one embodiment of the present disclosure, the controller 34 converts the output force command into an output torque command, and the controller 34 may control the traction motor(s) 18 via output torque command. Further, in particular embodiments, transmission ratio(s), drivetrain ratio(s), and/or tire or track size factors are utilized to determine the output torque command. Accordingly, for purposes of describing any embodiments of this disclosure, the output force or output force command described herein may include output torque or output torque command. The controller 34 determines the output force command as the amount of output force based on a difference between the work vehicle traction force and the threshold work vehicle traction force. The controller 34 further determines a scale factor S that represents the ratio of the output force of the traction motor(s) 18 (each individually in an embodiment and the sum of the output force of all traction motor(s) 18 in a further embodiment) relative to the work vehicle traction force. The scale factor S in an embodiment is a fraction or percentage of the work vehicle traction force that is less than 1/1 or 100%. In a further embodiment, the scale factor S is between 10% and 90% of the work vehicle traction force. The scale factor S is between 20% and 80% of the work vehicle traction force in a further embodiment and between 30% and 50% of the work vehicle traction force in an even further embodiment. The controller 34 applies the scale factor S by multiplication with the difference between the work vehicle traction force and the threshold work vehicle traction force to determine the output force command as the output force of the traction motor(s) 18 in the illustrated embodiment. Therefore, the output force command is determined using the following equation:

$$F_{Output} = S*(F_{Traction} - F_{ThresholdTraction}).$$

In additional embodiments, the drawbar 22 or other trailer coupling member includes a load sensor 36, and the controller 34 determines the work vehicle traction force based at least partially on a drawbar force, load force, or other value measured or otherwise determined via the load sensor 36. The drawbar or load force may indicate a draft force or pulling force between the work vehicle 12 and the trailer 10. The controller 34 may determine that an output force command as an increased output force of the traction motor(s) 18 is desired based on the drawbar or load force exceeding a threshold, or the controller 34 may proportionally increase the output force via output force command based on a proportional increase in drawbar or load force. Further, the controller 34 of an embodiment may apply the drawbar or load force as an additional factor, such as with the scale factor S and the difference between the work vehicle traction force and the threshold work vehicle traction force, to determine the output force command as the output force of the traction motor(s) 18, such as the drawbar or load force being used to validate and/or modify the output force command determined by the controller 34.

Although four traction motor(s) 18 are illustrated in FIG. 1, the system 20 of one or more embodiments includes any number of traction motor(s) 18, and the system 20 is configured for individual control of one or multiple traction motor(s) 18 or combined control of multiple traction motors 18. Further, the system 20 and/or the trailer 10 may include any number of wheels, tracks, or other ground-engaging members 16 with or without traction motor(s) 18 in particular embodiments. For example, the controller 34 of an embodiment may determine an output force command for control of a group of traction motors 18 and, in a further embodiment, determine a second output force command for control of a second group of traction motors 18. One of ordinary skill in the art will appreciate the many different configurations of ground-engaging members 16 and traction motors 18 upon understanding the embodiments of the present disclosure, and such configurations are included as embodiments of the present disclosure.

In a further embodiment, the controller 34 may determine the output force command as the output force for the traction motor(s) 18 based on determined slippage of the ground-engaging member(s) 16 and/or work vehicle ground-engaging member(s) 32. The controller 34 calculates or otherwise determines a theoretical speed of the ground-engaging member(s) 16, 32 based, at least in part, on the work vehicle a measured or otherwise determined wheel speed. The controller 34 then receives, measures, or otherwise determines an actual speed of the ground-engaging member(s) 16, 32, such as by receiving wheel speed data from the traction motor(s) 18 to name a non-limiting example. The controller 34 then determines the output force command as the output force for the traction motor(s) 18 based, at least in part, on a difference between the theoretical speed and the actual speed. The controller 34 of an embodiment may apply the difference between the theoretical speed and the actual speed as an additional factor with the scale factor S and the difference between the work vehicle traction force and the threshold work vehicle traction force to determine the output force command for the traction motor(s) 18, such as the difference between the theoretical speed and the actual speed being used to validate and/or modify the output force command determined by the controller 34.

Without in any way limiting the scope, interpretation, or application of the claims appearing below, it will be appreciated that the system 20 and/or the method 200 of the embodiments of the present disclosure allow highly precise and punctual control of assistive force by one or more ground-engaging member(s) 32 of the trailer 10. Further, the system 20 and the method 200 of particular embodiments utilize available data from the transmission 26, such as output shaft torque data from a current in the eIVT transmission of at least one embodiment, without relying on cumbersome, costly, or otherwise unnecessary sensors, system models, or processing operations to determine such data. The current data and correlated output shaft torque data of the IVT of the illustrated embodiment is provided via the normal electric motor generator operation of the eIVT transmission, which obviates the need for additional sensors, modeling, or estimations to determine such data. Accordingly, determination is more accurate, instant, continuous, and reliable.

Accordingly, certain technical effects of the embodiments described herein include, without limitation, improved traction control to increase operational efficiency, reduce wear on the vehicle 12 and associated equipment, reduce risk of product loss, and decrease the amount of time to complete a task by the vehicle 12 and trailer(s) without the additional cost or complexity of separate sensors and/or operations to avoid loss of traction. Further, it will be appreciated that the embodiments of the present disclosure may reduce and/or prevent jackknifing and/or other control interference events, such as those caused by unintended pushing of the vehicle 12 by the trailer 10, thereby improving safety and control of such systems and vehicles.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method of controlling at least one traction motor of a trailer coupled to a work vehicle via a trailer coupling member, the method comprising:
   determining a work vehicle traction force via a shaft torque of an output shaft of a work vehicle transmission;
   determining an output force command for the at least one traction motor coupled to a ground-engaging member of the trailer based at least partially on a difference between the work vehicle traction force and a threshold work vehicle traction force;
   applying a scale factor of less than one to the difference between the work vehicle traction force and the threshold work vehicle traction force; and
   controlling the at least one traction motor coupled to the ground-engaging member of the trailer according to the output force command modified by the scale factor.

2. The method of claim 1, further comprising:
   determining a forward movement of the work vehicle; and
   determining the output force command for the at least one traction motor based at least partially on a difference between the work vehicle traction force and the threshold work vehicle traction force and the forward movement of the work vehicle.

3. The method of claim 1, further comprising:
   determining a reverse movement of the work vehicle; and
   determining the output force command for the at least one traction motor based at least partially on a difference between the work vehicle traction force and the threshold work vehicle traction force and the reverse movement of the work vehicle.

4. The method of claim 1, wherein the work vehicle transmission is an electric infinitely variable transmission and the work vehicle traction force is determined via a motor generator component of the electric infinitely variable transmission.

5. The method of claim 1, further comprising:
   determining a drawbar force via a load sensor on the trailer coupling member; and
   applying the drawbar force as an additional factor to the difference between the work vehicle traction force and the threshold work vehicle traction force.

6. The method of claim 1, further comprising:
   determining a theoretical wheel speed at the at least one traction motor of the trailer based on a work vehicle wheel speed; and
   determining an actual wheel speed at the at least one traction motor of the trailer; and
   applying a difference between the theoretical speed and the actual speed of the work vehicle as an additional factor to the difference between the work vehicle traction force and the threshold work vehicle traction force.

7. The method of claim 1, wherein the at least one traction motor of the trailer coupled to the ground-engaging member of the trailer is an electric motor.

8. The method of claim 1, wherein the scale factor is between ten percent and ninety percent.

9. The method of claim 1, wherein the scale factor is between twenty percent and eighty percent.

10. The method of claim 1, wherein the scale factor is between thirty percent and fifty percent.

11. A traction control system comprising:
    a work vehicle configured to produce a work vehicle traction force determined via a shaft torque of an output shaft of a work vehicle transmission;
    a trailer coupled to the work vehicle via a trailer coupling member and configured to provide ground-engaging traction with at least one traction motor;
    at least one ground-engaging member of the trailer configured to be driven by the at least one traction motor; and
    a controller configured to determine an output force command for the at least one traction motor of the trailer based at least partially on a difference between the work vehicle traction force and a threshold work vehicle traction force, apply a scale factor of less than one to the difference between the work vehicle traction force and the threshold work vehicle traction force, and control the at least one traction motor of the trailer according to the output force command modified by the scale factor.

12. The traction control system of claim 11, wherein the controller is further configured to determine forward movement of the work vehicle and increase the output force command for the at least one traction motor when the work vehicle traction force is greater than the threshold work vehicle traction force and the work vehicle is moving forward.

13. The traction control system of claim 11, wherein the controller is further configured to determine reverse movement of the work vehicle and increase the output force command for the at least one traction motor when the work vehicle traction force is greater than the threshold work vehicle traction force and the work vehicle is moving in a reverse direction.

14. The traction control system of claim 11, wherein the transmission is an electric infinitely variable transmission and the work vehicle traction force is determined via a motor generator component of the electric infinitely variable transmission.

15. The traction control system of claim 11, further comprising:
- determining a drawbar force via a load sensor on the trailer coupling member; and
- applying a drawbar force as an additional factor to the difference between the work vehicle traction force and the threshold work vehicle traction force.

16. The traction control system of claim 11, wherein the controller is configured to:
- determine a theoretical speed of the at least one ground-engaging member based at least partially on a measured work vehicle wheel speed;
- determine an actual speed of the at least one ground-engaging member; and
- applying a difference between the theoretical speed and the actual speed of the work vehicle as an additional factor to the difference between the work vehicle traction force and the threshold work vehicle traction force.

17. The traction control system of claim 11, wherein the at least one traction motor of the trailer coupled to the ground-engaging member of the trailer is an electric motor.

18. A traction control system for a work vehicle producing a work vehicle traction force and being coupled to a trailer providing ground-engaging traction with at least one traction motor coupled to at least one ground-engaging member of the trailer, the traction control system comprising a controller configured to:
- determine an output force command for the at least one traction motor of the trailer based at least partially on a difference between a work vehicle traction force determined via a motor generator component of an electric infinitely variable transmission of the work vehicle and a threshold work vehicle traction force; and
- apply a scale factor of less than one to the difference between the work vehicle traction force and the threshold work vehicle traction force; and
- control the at least one traction motor of the trailer coupled to the ground-engaging member of the trailer according to the output force command modified by the scale factor.

19. The traction control system of claim 18, wherein the at least one traction motor of the trailer coupled to the ground-engaging member of the trailer is an electric motor.

* * * * *